(12) United States Patent
Aflatoon

(10) Patent No.: US 10,905,619 B2
(45) Date of Patent: Feb. 2, 2021

(54) MOTORIZED SELF-BALANCING WALKER

(71) Applicant: Kamran Aflatoon, Corona del Mar, CA (US)

(72) Inventor: Kamran Aflatoon, Corona del Mar, CA (US)

(*) Notice: Subject to any disclaimer, the term of this patent is extended or adjusted under 35 U.S.C. 154(b) by 204 days.

(21) Appl. No.: 16/107,397

(22) Filed: Aug. 21, 2018

(65) Prior Publication Data

US 2019/0133869 A1    May 9, 2019

Related U.S. Application Data

(60) Provisional application No. 62/548,149, filed on Aug. 21, 2017.

(51) Int. Cl.
*A61H 3/04* (2006.01)
*B62D 11/04* (2006.01)
*B62D 55/075* (2006.01)

(52) U.S. Cl.
CPC .............. *A61H 3/04* (2013.01); *B62D 11/04* (2013.01); *B62D 55/075* (2013.01); *A61H 2003/043* (2013.01); *A61H 2201/0161* (2013.01); *A61H 2201/0165* (2013.01); *A61H 2201/0173* (2013.01); *A61H 2201/0192* (2013.01); *A61H 2201/1215* (2013.01); *A61H 2201/164* (2013.01); *A61H 2201/1633* (2013.01); *A61H 2201/1635* (2013.01); *A61H 2201/5023* (2013.01)

(58) Field of Classification Search
CPC .............. A61H 3/04; A61H 2003/043; A61H 2201/0161; A61H 2201/0165; A61H 2201/0173; A61H 2201/0192; A61H 2201/1215; A61H 2201/1633; A61H 2201/1635; A61H 2201/0164; A61H 2201/5023; B62D 11/04; B62D 55/075
USPC ........................................................ 180/6.5
See application file for complete search history.

(56) References Cited

U.S. PATENT DOCUMENTS

| | | | | |
|---|---|---|---|---|
| 1,213,454 | A * | 1/1917 | Brown | A63C 17/01 |
| | | | | 280/87.042 |
| 3,751,062 | A * | 8/1973 | White, Sr. | B62K 3/002 |
| | | | | 280/87.042 |
| 5,499,856 | A | 3/1996 | Sorrell | |
| 7,073,805 | B2 * | 7/2006 | Yan | B62M 1/30 |
| | | | | 280/221 |
| 7,575,075 | B2 * | 8/2009 | Fairhead | B62D 1/02 |
| | | | | 180/6.48 |
| 8,540,284 | B2 * | 9/2013 | Falanga | F16D 55/226 |
| | | | | 280/842 |
| 8,789,628 | B2 * | 7/2014 | Swenson | A61G 5/066 |
| | | | | 180/6.5 |
| 9,855,173 | B2 * | 1/2018 | Kennedy | A61G 5/066 |

(Continued)

*Primary Examiner* — Jacob D Knutson
(74) *Attorney, Agent, or Firm* — Royal W. Craig; Gordon Feinblatt LLC

(57) ABSTRACT

A motorized walker that employs a wide angle triangular track suspension system on both sides with an elevated drive sprocket and a deployable self-balancing stand-on platform suspended from the axle of the drive sprocket that the user may use or not, depending on their walking comfort level. With or without the platform deployed the walker with track system is capable of overcoming large obstacles and steep inclines, for rough terrain applications, where a relatively large pivot angle is needed.

19 Claims, 3 Drawing Sheets

(56) References Cited

U.S. PATENT DOCUMENTS

2008/0072942 A1 3/2008 Warren
2019/0365592 A1* 12/2019 Norton .................... A61H 3/04

* cited by examiner

MOTORIZED SELF-BALANCING WALKER

CROSS-REFERENCE TO RELATED APPLICATION(S)

The present application derives priority from U.S. Provisional Patent Application No. 62/548,149 filed 21 Aug. 2017.

BACKGROUND OF THE INVENTION

1. Field of the Invention

The present invention relates generally to mobility assist devices for walking assistance and, more particularly, to a motorized self-balancing walker with endless-tracks capable of overcoming large obstacles and steep inclines.

2. Description of the Background

Elderly or disabled patients frequently use walkers comprised of two-sided frames with front and back legs, a front brace, and plain or wheeled leg tips. These walkers are ubiquitous, and though they reduce the risk of falling they do not prevent it, and are not at all useful for the patient who falls backwards. The National Center for Injury Prevention has found that about 47,300 people aged 65 and older suffer injuries from falls every year using walking aids, and walkers are seven times more likely to be involved in a fall than a cane. There are several previous attempts at more failsafe walkers that take several different approaches to the problem.

For example, U.S. Pat Application 20080072942 by Sydney Warren suggests static padding and air bags to protect the user in case of a fall. The walker has a tilt sensor that triggers the air bag.

U.S. Pat. No. 5,499,856 to Michael R. Sorrell suggests a safety walker that resists backward motion of the walker.

The foregoing walkers help, but really do not address some of the major problems for any walker having wheels. If an obstacle is encountered. The user must back up. Moreover, if a walking surface becomes steep, the user must physically adapt and keep walking. These issues still result in thousands of walker injuries every year. What is needed is a motorized self-leveling walker with endless tracks rather than wheels to completely avoid walker injuries.

A variety of track suspension systems have been employed in the prior art, including a triangular configuration having an advantage in that the drive sprocket is mounted above the ground surface and provides a pivot for the vehicle frame. However, the pivot angle is usually quite small. What is desired is a walker with a track system capable of overcoming large obstacles and steep inclines, for rough terrain applications, where a relatively large pivot angle is needed.

It would be advantageous to provide a motorized walker that employs endless tracks instead of wheels for steep inclines and rough terrain, and a self-balancing stand-platform that the user can use or not, depending on their comfort level walking.

SUMMARY OF THE INVENTION

It is, therefore, an object of the present invention to provide a motorized walker that employs a wide angle triangular track suspension system on both sides with an elevated drive sprocket and a deployable self-balancing stand-platform suspended from the axle of the drive sprocket that the user use or not, depending on their walking comfort level. With or without the platform deployed the walker with track system is capable of overcoming large obstacles and steep inclines, for rough terrain applications, where a relatively large pivot angle is needed.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

The present invention is a motorized walker that employs endless tracks instead of wheels to navigate steep inclines and rough terrain, plus a counterbalanced self-righting stand-on platform that the user can use or not, depending on their comfort level walking. The walker significantly reduces the risk of injury on rocky or steep terrain, and all but eliminates the need to back up. Consequently, there are far fewer injuries from falling backward.

Figure 1:
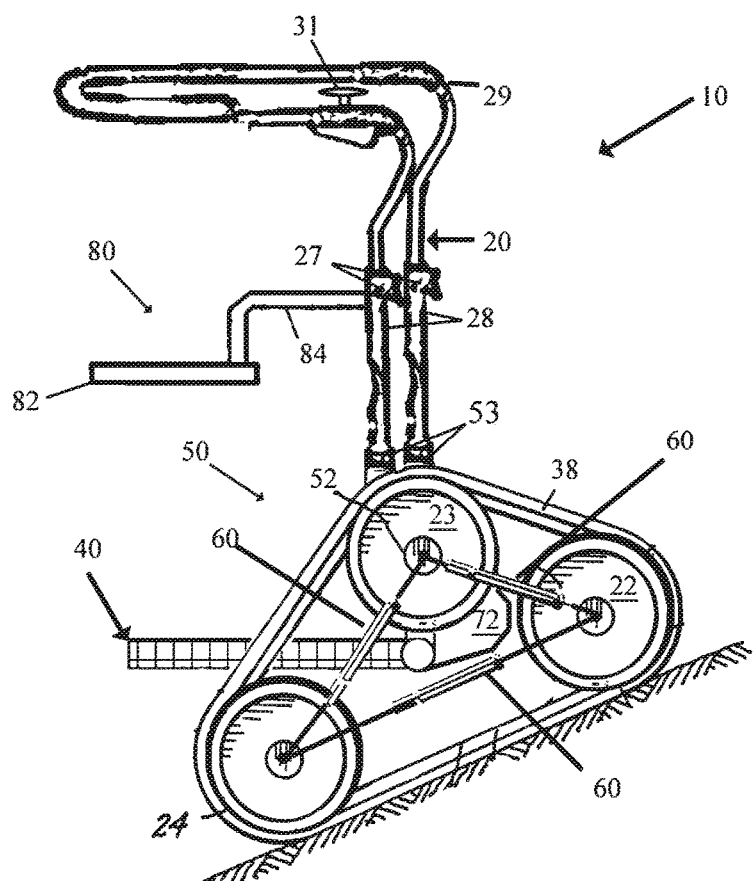
FIG. 1 is a perspective side view of a motorized walker 10 according to an embodiment of the invention going up a hill.

As seen in FIG. 1, the motorized walker 10 generally comprises an erect handlebar assembly 20 extending downward to the stand-on platform 40. A fold-away seat 80 is mounted between the handlebar assembly 20 and stand-on platform 40.

Both the handlebar assembly 20 and stand-on platform 40 are pivotally mounted to the elevated drive axle 52 of a motorized base assembly 50 that employs two opposed endless tracks 38 for overcoming large obstacles. The combination handlebar assembly 20/standing platform 40 is self-righting, such that a user standing on the standing platform 40 will remain erect no matter the angle of the base assembly 50.

The handlebar assembly 20 includes a tubular handle 29 with contiguous U-shaped rear leaning post to prevent inadvertent backward falling. The handle 29 extends downward to two distal ends that are telescopically received into tubular posts 28, the posts 28 including distal screw-clamps 27 for clamping the handle 29 at a desired height. The fold-away seat 80 is mounted to the top of posts 28 below screw clamps 27, and includes identical right and left folding sections that pivot down to suspend a seat 82 between the posts 28.

The posts 28 extend down to mounting collars 53 that are pivotally secured about the drive axle 52 by radial bearings for low friction operation. The posts 28 continue below the drive axle to suspend the stand-on platform 40. The stand-on platform 40 is hinged to the posts 28 at 90 degree hinges, allowing it to be deployed horizontal as shown for standing ride-on passage, or pivoted upward between the posts 28 and stowed vertically there between. This facilitates use of the device 10 as a ride-on device or power-assisted walker.

Figure 2:
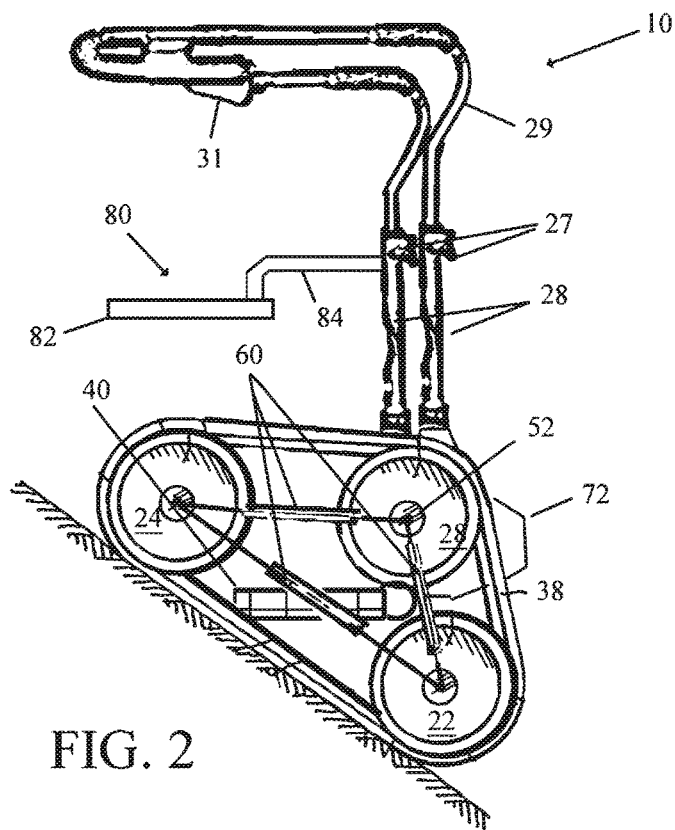
FIG. 2 is a perspective side view of a motorized walker 10 as in FIG. 1 going down a hill.

As seen in FIGS. 1-2, a power pack 72 including dual electric motors, battery and control box is mounted forward of the platform 40. The power pack 72 ride tandem in advance of platform 40 (is likewise pivotally suspended below drive axle 52) and helps to counterbalance the stand-on platform 40. The motors of power pack 72 directly but independently drive the right and left side endless tracks 54, and accomplish steering by differential power thereto. A controller 31 mounted on handle bar 29 is electrically connected to the power pack 72 and includes both speed and steering (differential) control.

Given a fixed-weight user standing on platform 40, the standing platform 40 remains horizontal and the posts 28 vertical despite the angle of the base assembly 50 (or the incline of the ground upon which it sits). This is illustrated in FIG. 1 versus FIG. 2, the user remaining perfectly upright.

The base assembly 50 includes two opposed endless delta track assemblies preferably identical in construction. Each of the track assemblies includes an active drive wheel 23, and the two opposed active drive wheels 23 are joined by an elevated drive axle 52. In addition, each of the track assemblies 54 includes a fore idler wheel 22 and an aft idler wheel 24. An endless belt 38 is mounted about each set of wheels 22, 23, 24 in a triangular/delta configuration. A spring-preloaded pneumatic cylinder 60 straddles each pair of wheels 22, 23, 24 to tension the endless belt 38 and to provide shock damping.

Figure 3:
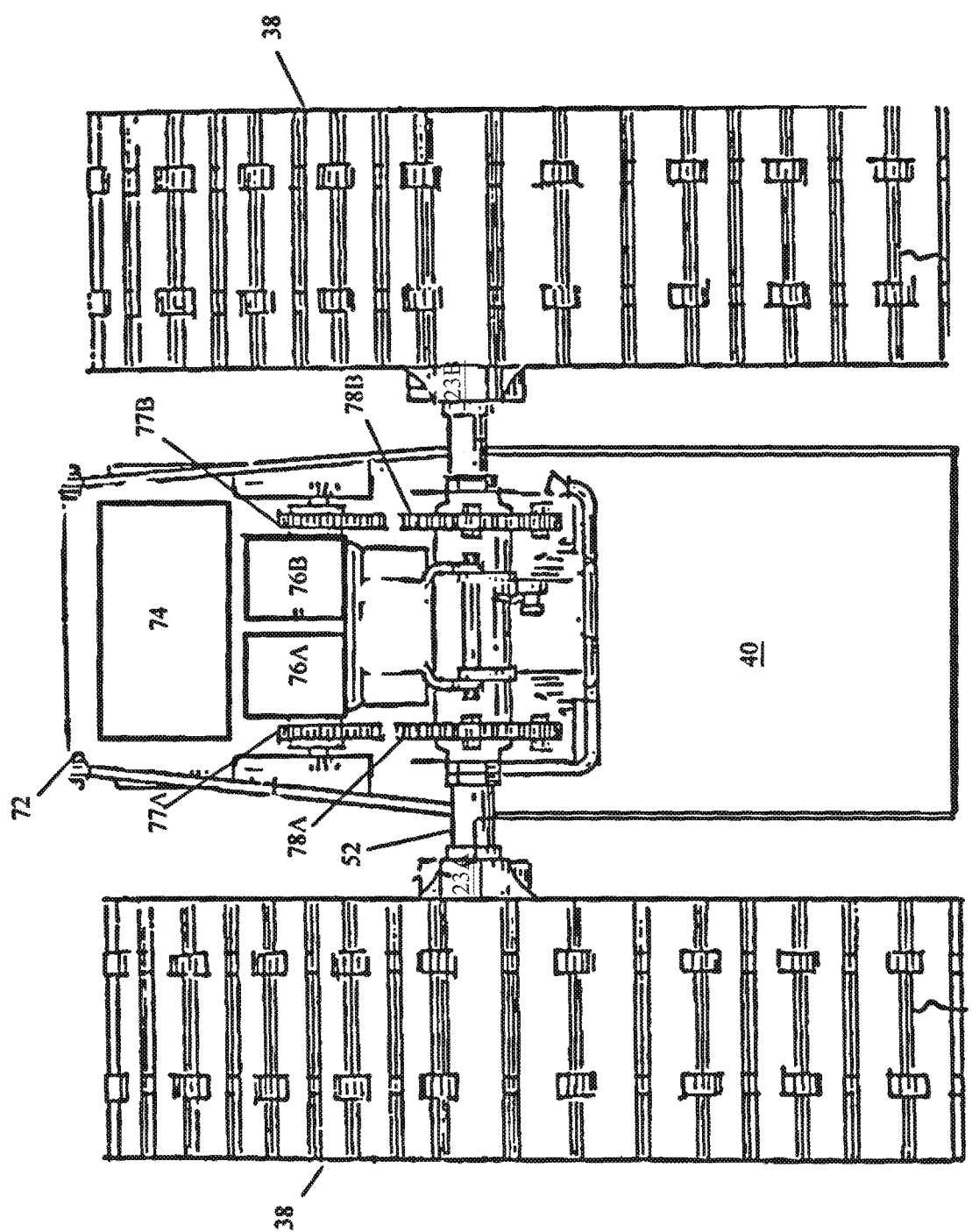
FIG. 3 is a perspective bottom view of the motorized walker 10 as in FIGS. 1-2.

As best seen in FIG. 3, each track drive wheel 23 (right and left sides) preferably includes a drive sprocket 78A, 78B mounted on the drive axle 52. Each drive sprocket 78A, 78B is rotated by a rechargeable battery 74-powered twin electric motors 76A, 76B all fully contained within housing 72 and suspended forwardly below the drive axle 52 in advance of platform 40 and posts 28. The endless belts 38 are draped over the drive wheel 23, extend forwardly around the forward idler wheel 22, and then extend horizontally, rearwardly to and around the rear idler wheel 24, and thereafter extends back to the drive wheel 23.

Figure 4:
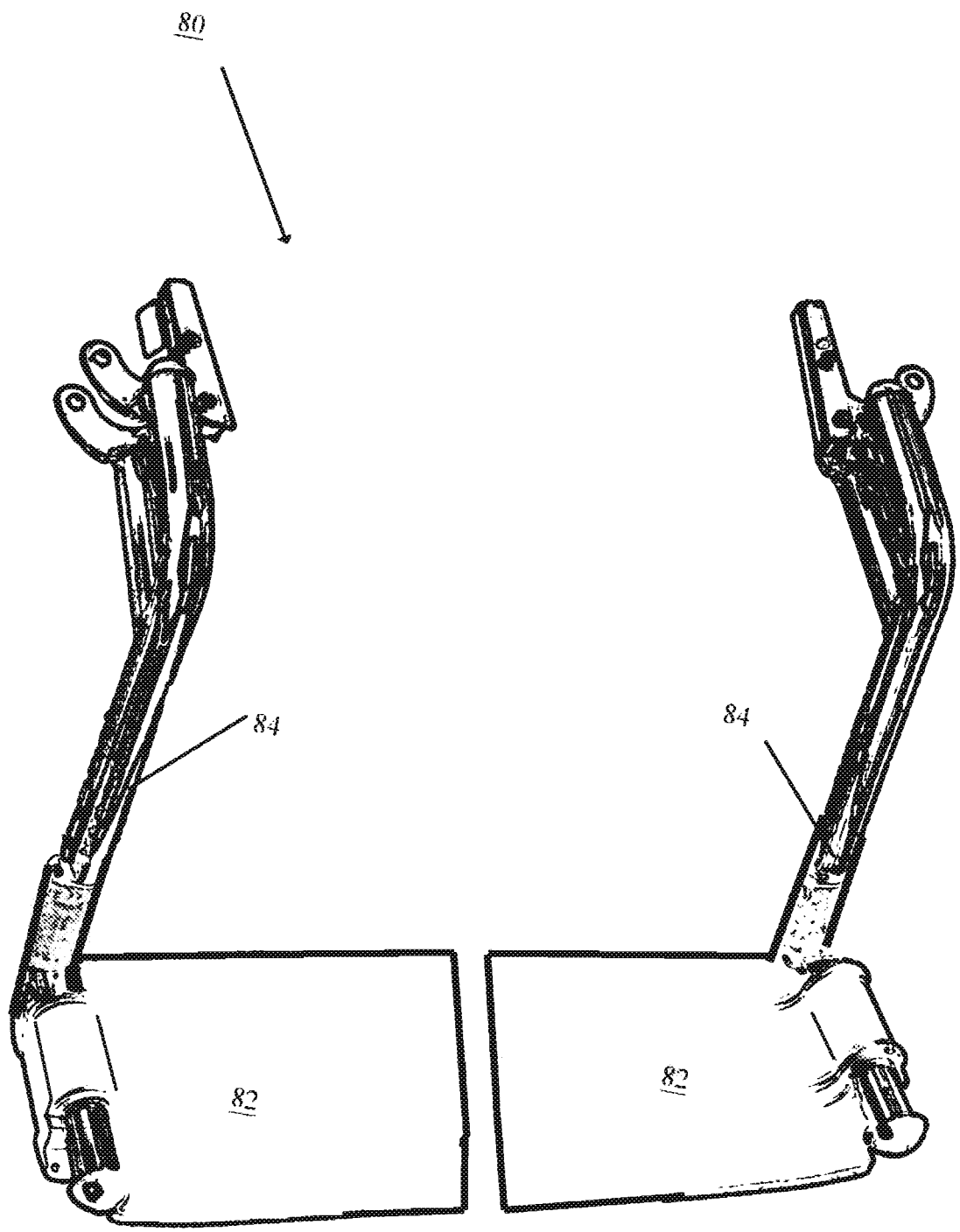
FIG. 4 is a perspective front view of the fold-away seat 80 as in FIGS. 1-2.

FIG. 4 is a close-up view of the fold-away seat 80 that is mounted to the top of posts 28 (see FIG. 1). The seat 80 is similar to conventional wheelchair swing-away footrests which are sold as a pair, with identical right and left folding sections that pivot down to suspend a seat between the posts 28. This provides the user with the option to proceed while seated if too tired to stand.

It should now be apparent that the above-described walker 10 will accommodate a user whether they a confident in walking or not, depending on their comfort level. With or without the platform deployed the walker with track system is capable of overcoming large obstacles and steep inclines, for rough terrain applications, where a relatively large pivot angle is needed.

One skilled in the art should appreciate that slight modifications may be made without departing from the scope of spirit of the invention. For example, front and/or rear stabilizer wheels may be employed, and there may be different numbers of idler wheels, and different endless track configurations, all as a matter of design choice.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed is:

1. A mobility walker, comprising:
a pair of endless tread assemblies, each tread assembly including a plurality of wheels and a continuous track wrapped about all of said respective plurality of wheels;
a user-support assembly comprising a stand-on platform and an erect handle bar assembly projecting from said platform, said user support assembly being pivotally connected to said pair of endless tread assemblies with said stand-on platform suspended between said pair of endless tread assemblies and self-leveling relative when counterbalanced by a user standing on said platform to a horizontal orientation position with said handle bar assembly erect.

2. The mobility walker according to claim 1, wherein said stand-on platform comprises two fold-up sections.

3. The mobility walker according to claim 1, wherein said handle bar assembly comprises a tubular handle.

4. The mobility walker according to claim 1, wherein said handle bar assembly comprises a pair of parallel supports joined at one end by a tubular handle.

5. The mobility walker according to claim 4, wherein said tubular handle is contiguous.

6. The mobility walker according to claim 5, wherein said tubular handle is U-shaped and substantially perpendicular to said pair of parallel supports.

7. The mobility walker according to claim 1, wherein each of said pair of endless tread assemblies further comprises a drive wheel and a pair of idler wheels.

8. The mobility walker according to claim 1, further comprising a power pack mounted forwardly of said platform and including a battery and at least one electric motor.

9. The mobility walker according to claim 7, further comprising a power pack mounted forwardly of said platform and including a battery and an electric motor.

10. The mobility walker according to claim 9, wherein said at least one electric motor is mechanically coupled to the drive wheel of one of said pair of endless tread assemblies.

11. The mobility walker according to claim 7, further comprising a power pack mounted forwardly of said platform and including at least one battery and a pair of electric motors.

12. The mobility walker according to claim 11, wherein each of said pair of electric motors is mechanically coupled to the corresponding drive wheel.

13. The mobility walker according to claim 9, further comprising a controller mounted on said handle bar assembly for actuating said at least one electric motor.

14. The mobility walker according to claim 11, further comprising a controller mounted on said handle bar assembly for actuating said pair of electric motors and steering by differential control of said two electric motors.

15. A mobility walker, comprising:
a pair of endless tread assemblies, each including a drive axle and sprocket connected to a drive wheel, and a plurality of idler wheels, and a continuous track wrapped around said drive wheel and idler wheels;
a stand-on platform and handle bar assembly pivotally mounted on one side of said drive axle between said pair of endless tread assemblies by radial bearings;
a power pack counter-balance-mounted on another side of said drive axle and including a battery and two electric motors, each motor engaged to the sprocket of a corresponding endless tread assembly; and a controller mounted on said handle bar assembly for control of said two electric motors.

16. The mobility walker according to claim 15, wherein said stand-on platform comprises two fold-up sections.

17. The mobility walker according to claim 15, wherein said handle bar assembly comprises a pair of parallel supports joined at one end by a tubular handle.

18. The mobility walker according to claim 17, wherein said tubular handle is contiguous, U-shaped and substantially perpendicular to said pair of parallel supports.

19. The mobility walker according to claim 15, wherein said controller mounted on said handle bar assembly steers said mobility walker by differential control.

* * * * *